G. A. BOSLER.
FOLDING CAR STEP.
APPLICATION FILED MAR. 25, 1918.
1,273,321.
Patented July 23, 1918.
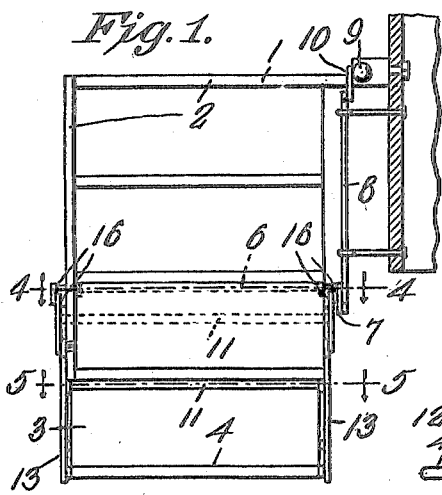
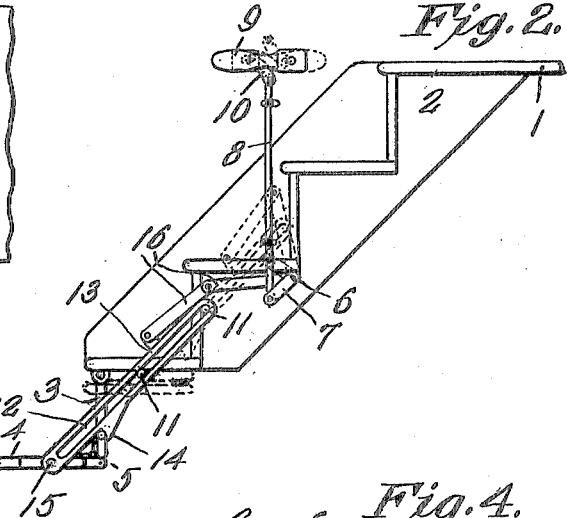
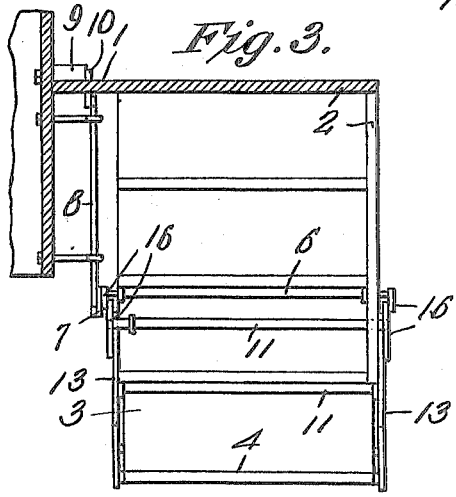
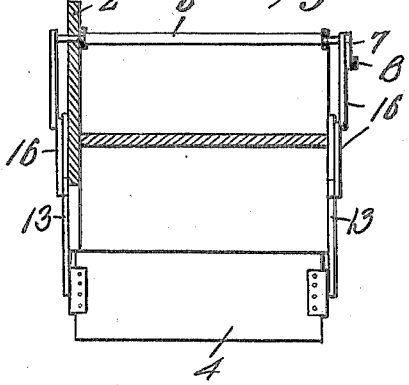
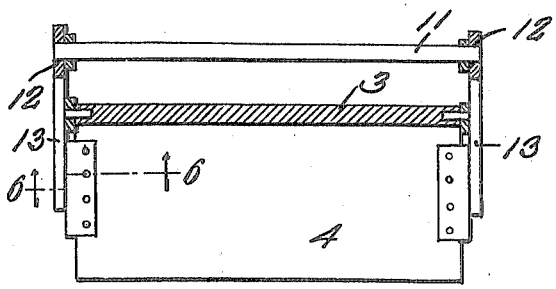
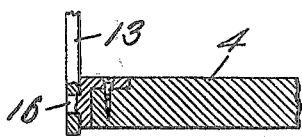
Inventor
G. A. Bosler,
Witnesses

UNITED STATES PATENT OFFICE.

GEORGE A. BOSLER, OF CHICAGO, ILLINOIS.

FOLDING CAR-STEP.

1,273,321.   Specification of Letters Patent.   Patented July 23, 1918.

Application filed March 25, 1918. Serial No. 224,628.

*To all whom it may concern:*

Be it known that I, GEORGE A. BOSLER, a citizen of the United States, residing at Chicago, in the county of Cook, State of Illinois, have invented certain new and useful Improvements in Folding Car-Steps; and I do hereby declare the following to be a full, clear, and exact description of the invention, such as will enable others skilled in the art to which it appertains to make and use the same.

The present invention is directed to improvements in folding car steps, and has for its object to provide a device of this character which can be attached to the fixed steps and to be folded or extended as desired.

A further object of the invention is to provide a folded car step which can be conveniently operated from the platform of a car so as to move the folded step in close proximity to the platform and can be readily folded so as to be out of the way when not in use.

With these and other objects in view, this invention resides in the novel features of construction, formation, combination and arrangement of parts to be hereinafter more fully described, claimed and illustrated in the accompanying drawing, in which:—

Figure 1 is a front view of the device.

Fig. 2 is a side view.

Fig. 3 is a rear view.

Fig. 4 is a sectional view on line 4—4 of Fig. 1.

Fig. 5 is a sectional view on line 5—5 of Fig. 1.

Fig. 6 is a similar view on line 6—6 of Fig. 5.

Referring to the drawing 1 indicates the platform of the car, and 2 the usual fixed steps. To the tread of the lowermost step is hingedly connected the riser 3 of the folding step, the tread 4 thereof being hingedly connected to said riser. To the ends of the riser 3 are secured lugs 5, the purpose of which will appear later.

Journaled beneath the steps 2 is a shaft 6, said shaft carrying at its ends the arms 7. To one of the arms is pivotally connected the lower end of the rod 8, said rod being pivotally connected to the handle 9 by the link 10. The steps 2 are provided with rods 11 which extend beyond the side bars of the steps and slidably engage the slots 12 formed in the bars 13, said bars having formed thereon shoulders 14, the purpose of which will later appear.

The tread 4 of the folding step has its ends provided with lugs 15 which are pivotally engaged in the lower ends of the bars 13 so that when said bars are moved upwardly the riser 3 and tread 4 will be compelled to fold beneath the lowermost tread of the fixed steps.

Pivotally connected to the arms 7 and bars 13 are jointed links 16.

In operation the handle 9 is swung inwardly, which action rocks the shaft 6 so as to cause the links 16 to draw the bar 13 upwardly thus folding the riser 3 and tread 4 beneath the lowermost tread of the steps 2. When the handle 9 is swung to its extreme limit of movement to the right it is obvious that the rod 8 will be held from moving downwardly thus holding the supplemental step in its folded position. When the bar 13 is moved downwardly the shoulders 14 will engage the lugs 5 thus causing the supplemental step to unfold and will hold the same steady when in use.

What is claimed is:—

In a device of the class described, a platform having fixed steps, a folding step comprising a riser and a hingedly connected tread, said riser being hingedly connected to the fixed steps, lugs carried by the fixed steps, a bar having a longitudinal slot formed therein for slidably engaging the lugs, a shaft journaled transversely of the fixed steps, arms carried by the shaft, jointed links connecting the bar and arms, shoulders carried by the bars, said riser and tread having lugs and pins carried respectively thereby, said pins being pivotally engaged with the lower ends of the bar, the lugs of the riser being adapted to be engaged by the shoulders, and means for rocking the shaft to move the bar upwardly or downwardly, as and for the purpose set forth.

In testimony whereof, I affix my signature, in the presence of two witnesses.

GEORGE A. BOSLER.

Witnesses:
WM. C. WOOD,
SIGNE HALLQUIST.

Copies of this patent may be obtained for five cents each, by addressing the "Commissioner of Patents, Washington, D. C."